United States Patent [19]

Oishi et al.

[11] Patent Number: 4,644,434
[45] Date of Patent: Feb. 17, 1987

[54] SHUTTER MEMBER FOR A MAGNETIC DISK CARTRIDGE

[75] Inventors: Kengo Oishi; Tuyoshi Ono, both of Odawara, Japan

[73] Assignee: Fuji Photo Film Co., Ltd., Japan

[21] Appl. No.: 527,287

[22] Filed: Aug. 29, 1983

[30] Foreign Application Priority Data

Sep. 6, 1982 [JP] Japan ............................ 57-135025[U]

[51] Int. Cl.[4] ........................ G11B 23/03; B65D 85/30
[52] U.S. Cl. ...................................... 360/133; 206/444
[58] Field of Search ........................... 360/133, 97, 99;
206/444; 358/906

[56] References Cited

U.S. PATENT DOCUMENTS

| | | | |
|---|---|---|---|
| 4,120,012 | 10/1978 | Bowers | 360/133 |
| 4,185,314 | 1/1980 | Hatchett et al. | 360/133 |
| 4,443,874 | 4/1984 | Steenberg | 360/133 |
| 4,482,929 | 11/1984 | Beck et al. | 360/133 |
| 4,488,190 | 12/1984 | Oishi et al. | 360/133 |
| 4,503,474 | 5/1985 | Nigam | 360/133 |
| 4,517,617 | 5/1985 | Tsuji et al. | 360/133 |
| 4,525,758 | 6/1985 | Nakagawa et al. | 360/133 |

OTHER PUBLICATIONS

Carey et al., IBM Technical Disclosure Bulletin, vol. 27, No. 1A, pp. 40-41, Jun. 1984.

Primary Examiner—A. J. Heinz
Assistant Examiner—Melissa J. Koval
Attorney, Agent, or Firm—Pasquale A. Razzano; Curtis, Morris & Safford

[57] ABSTRACT

A magnetic disk cartridge comprising a magnetic disk for conducting image recording and reproducing through high-speed rotation and a case having a magnetic head receiving hole near a diagonal line of the case is provided with a shutter member having a rotation center at the corner of the case nearest to the magnetic head receiving hole. The shutter member is rotated fanwise to open and close the magnetic head receiving hole. The magnetic head receiving hole is opened when a portion of the shutter member engages an exterior shutter opening contact member of a recording device upon insertion of the magnetic disk cartridge. The magnetic head receiving hole is closed upon removal of the disk cartridge from the recording device.

5 Claims, 2 Drawing Figures

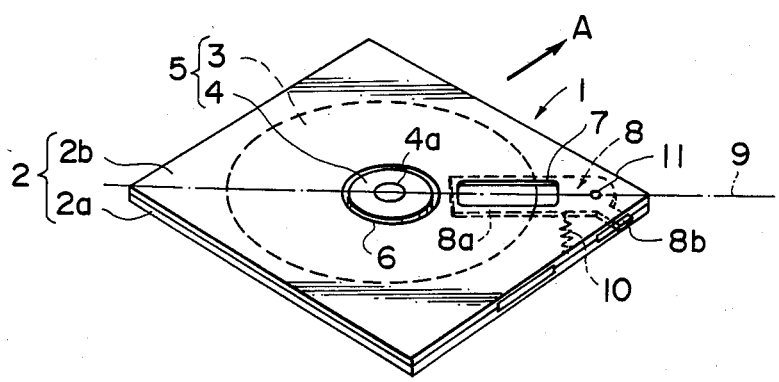
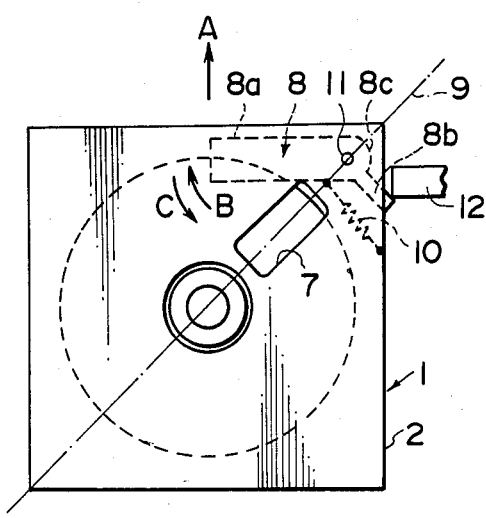

SHUTTER MEMBER FOR A MAGNETIC DISK CARTRIDGE

BACKGROUND OF THE INVENTION

1. Field of the Invention

This invention relates to a magnetic disk cartridge. More particularly, this invention relates to a magnetic disk cartridge comprising a very thin, small-diameter disk-like recording medium used for recording and reproducing an image through high-speed rotation.

2. Description of the Prior Art

Recording media formed by coating a magnetic material on both surfaces of a disk-like flexible polyester sheet, i.e. floppy disks, were developed for recording therein digital information by use of a magnetic head. Since floppy disks are easy to handle and their cost is low, they are widely used as recording media for computers.

On the other hand, in still cameras, it has been proposed to take advantage of the usefulness of the floppy disks as described above and the merit thereof over silver halide emulsion films that the recording media can be reused for magnetic recording. Namely, it has been proposed to use a magnetic disk cartridge (hereinafter simply referred to as "cartridge") formed by decreasing the size of the floppy disk, i.e. decreasing the diameter and the thickness of the disk-like recording medium, and also reducing the size of the case for containing the recording medium so as to constitute a recording medium for recording and reproducing an image through high-speed rotation, Thus, there was developed a magnetic recording type still camera having approximately the same size as the conventional 35 mm camera.

The aforesaid cartridge is of the single-faced recording type wherein the video signals for one image are recorded in one track of the recording medium, and video signals for a larger number of images than can be recorded on a conventional standardized silver halide emulsion film, for example video signals for about 50 images, are recorded on one surface of the recording medium.

As described in Japanese Unexamined Utility Model Publication No. 57(1982)-110788, in the single-faced recording cartridge, it is necessary that a pair of magnetic head receiving holes formed in face-to-face relation in the bottom and top walls of the case be positioned near a diagonal line of the case so that the position of the magnetic head receiving holes may not be the same when the case is placed upside down, thereby to prevent the magnetic head for image recording and reproducing from contacting and damaging the recording medium when the cartridge is erroneously inserted upside down into an apparatus.

Further, since the cartridge is carried and used outdoors, it sometimes happens that the recording medium is affected by dust or contacted with and damaged by other materials. Therefore, when the magnetic head receiving holes are provided near a diagonal line of the case, it is necessary to close the magnetic head receiving holes in order to prevent dust from entering the case and protect the recording medium so that the magnetic layer of the recording medium will not be damaged due to contact with other materials.

SUMMARY OF THE INVENTION

The primary object to the present invention is to provide a cartridge which prevents dust from entering the case from a magnetic head receiving hole positioned near a diagonal line of the case when the cartridge is not used for image recording and reproducing.

Another object of the present invention is to provide a cartridge wherein the recording medium is prevented from being contacted with and damaged by other materials at the magnetic head receiving hole.

The cartridge of the present invention is characterized by the provision of a shutter member which has a rotation center portion at the corner portion of the case nearest to a magnetic head receiving hole positioned near a diagonal line of the case, and which rotates fanwise to open and close the magnetic head receiving hole.

In the present invention, a part of the shutter member may be projected from a side wall of the case parallel to the inserting direction of the cartridge, and/or there may be provided and urging means for urging the shutter member in the direction closing the magnetic head receiving hole.

Since the cartridge of the present invention is provided with the shutter member for closing the magnetic head receiving hole when the cartridge is not used for image recording and reproducing, it is possible to prevent dust from entering the cartridge from the magnetic head receiving hole and protect the magnetic medium exposed to the outside at the magnetic head receiving hold even when there is much dust around the cartridge or when the cartridge is contacted with other materials.

When a part of the shutter member is projected from a side wall of the case parallel to the inserting direction of the cartridge so that the projected part can be contacted with a shutter opening contact member provided in the cartridge insertion passageway of an apparatus, and when the shutter member is provided with an urging member for urging the shutter member in the direction closing the magnetic head receiving hole, it is possible to accurately open and close the shutter member according to the use condition of the cartridge.

Namely, when the cartridge is inserted into an apparatus for image recording and reproducing, the part of the shutter member projected from the side wall of the case becomes contacted with the shutter opening contact member of the apparatus, and the shutter member is rotated thereby to open the magnetic head receiving hole. When the cartridge is ejected from the apparatus, contact of the projected part of the shutter member with the shutter opening contact member of the apparatus is released, and the shutter member is returned to the position closing the magnetic head receiving hole by the urging means.

BRIEF DESCRIPTION OF THE DRAWINGS

FIG. 1 is a perspective view showing an embodiment of the cartridge in accordance with the present invention, and FIG. 2 is a schematic view showing the operation of the cartridge of FIG. 1.

DESCRIPTION OF THE PREFERRED EMBODIMENTS

The present invention will hereinbelow be described in further detail with reference to the accompanying drawings.

Referring to FIGS. 1 and 2, a cartridge 1 is constituted by a magnetic disk 5 comprising a thin, flexible disk-like recording medium 3 and a hub 4 secured to the center of the recording medium 3, and a sheet-like case 2 comprising an upper half 2a and a lower half 2b for containing the magnetic disk 5. The recording medium 3 comprises a very thin base, for example a polyester sheet having a thickness of 50μ or less, and a magnetic layer formed on the base by coating, deposition, sputtering, or the like so as to record video signals therein. For example, when video signals for 50 images are recorded in one surface of the recording medium 3 with signals for one image on each track, and when the track width is 100μ and the guard band width is 100μ, the 1 cm width of the recording medium 3 is used for image recording and reproducing. The hub 4 consists of a pair of columnar members secured, for example, by ultrasonic fusion with the recording medium 3 intervening therebetween. At the center of one end face of the hub 4 is positioned an engagement hole 4a for engagement with a rotation shaft inserted in one direction for rotating the magnetic disk 5 at high speeds. At the center of the bottom wall of the lower half 2b is formed a hub hole 6 for exposing the end face of the hub 4 having the engagement hole 4a. In the bottom wall of the lower half 2b is also formed an approximately rectangular magnetic head receiving hole 7 extending in the radial direction of the recording medium 3 along a diagonal line 9 of the case 2. In the top wall of the upper half 2a, an opening (not shown) for inserting a supporting member for eliminating the deflection of the recoring medium 3 when the magnetic head contacts the recording medium 3 is formed so as to correspond to the magnetic head receiving hole 7 of the lower half 2b. As shown in FIG. 2, the shutter member 8 comprises an approximately rectangular plate-like main body 8a, a rotation axis receiving hole 8c positioned at one end portion of the main body 8a, and a protrusion 8b projecting from said end portion of the main body 8a. The rotation shaft receiving hole 8c is fitted onto a shaft 11 positioned at the corner portion nearest to the magnetic head receiving hole 7, so that the main body 8a can be rotated around the shaft 11 to open and close the magnetic head receiving hole 7. The protrusion 8b is projected from the side wall of the case 2 parallel to the inserting direction (indicated by the arrow A) of the cartridge 1. The shutter member 8 is urged in the direction closing the magnetic head receiving hole 7 by an urging member 10 comprising a spring, a rubber piece, or the like. Therefore, the magnetic head receiving hole 7 is closed by the shutter member 8 unless an external force, for example, manual moving force, is applied to the shutter member 8 against the urging member 10.

When the cartridge 1 is loaded into an apparatus for image recording and reproducing, the shutter member 8 is operated as described below. First, a shutter opening contact member 12 is secured to the cartridge insertion passageway of the apparatus. Then, the cartridge 1 is inserted into the apparatus in the direction indicated by the arrow A. Just before the cartridge 1 reaches a predetermined loading position in the apparatus, the protrusion 8b of the shutter member 8 projecting from the side wall of the case parallel to the inserting direction of the cartridge 1 comes in contact with the shutter opening contact member 12 of the apparatus. Therefore, the shutter member 8 is rotated by the contact of the protrusion 8b with the shutter opening contact member 12 in the direction indicated by the arrow B shown in FIG. 2. When the cartridge 1 is loaded in the predetermined loading position, the shutter member 8 is in the condition opening the magnetic head receiving hole 7. When the cartridge 1 is ejected from the apparatus, the contact of the protrusion 8b of the shutter member 8 with the shutter opening contact member 12 of the apparatus is released. The shutter member 8 is rotated in the direction indicated by the arrow C shown in FIG. 2 by the urging member 10 which urges the shutter member 8 in the direction closing the magnetic head receiving hole 7. Thus, the shutter member 8 closes the magnetic head receiving hole 7. Namely, the shutter member 8 conducts an opening operation when the cartridge 1 is loaded into the apparatus, and conducts a closing operation when the cartridge is ejected from the apparatus. In this manner, the opening and closing operations of the shutter member 8 are conducted automatically according to the use condition of the cartridge 1.

In the present invention, it is also possible to use a shutter member having a U-shaped cross-section so that the magnetic head receiving hole of the lower half and the opening of the upper half corresponding to the magnetic head receiving hole can be opened and closed simultaneously by a single shutter member.

We claim:

1. A magnetic disk cartridge comprising a magnetic disk for conducting image recording and reproducing through high-speed rotation, said disk including a flexible, disk-like recording medium having a central portion, and a hub at said central portion, said cartridge also comprising an approximately square sheet-like case having upper and lower halves for containing said magnetic disk therebetween, one of said halves having a magnetic head receiving hole for insertion of a magnetic head for image recording and reproducing and being located in the vicinity of a diagonal line of said case, wherein the improvement comprises a unitary shutter member rotatably mounted within said case between said halves, said shutter member including a main body portion which is generally rectangular and has a rotation center at a corner portion of said case nearest to said magnetic head receiving hole, said shutter member also including a smaller rectangular arm defining a protrusion extending outwardly from the main body portion at an obtuse angle therefrom so that a corner of that arm projects out of the case to a position for engagement with an exterior shutter opening contact member of a recording device when inserted therein whereby said shutter member will rotate to open said magnetic head receiving hole.

2. A magnetic disk cartridge as defined in claim 1 wherein said protrusion projects outwardly of the case generally perpendicular to the inserting direction of said magnetic disk cartridge.

3. A magnetic disk cartridge as defined in claim 1 or 2 including means for urging said shutter member in the direction closing said magnetic head receiving hole.

4. A magnetic disk cartridge as defined in claim 1, 2 or 3 wherein said upper half of the case has an opening for insertion of a member for supporting said recording medium and said lower half of the case is provided with said magnetic head receiving hole so as to correspond to said opening for insertion of the support member.

5. A magnetic disk cartridge as defined in claim 4 wherein said shutter member has a U-shaped cross-section and is capable of simultaneously opening and closing said magnetic head receiving hole and said opening for insertion of the supporting member.

* * * * *